Patented Oct. 31, 1933

1,932,807

UNITED STATES PATENT OFFICE 1,932,807

PLASTIC ACOUSTIC PULP

Mario Valdastri, Honolulu, Territory of Hawaii

No Drawing. Application October 28, 1932
Serial No. 640,049

3 Claims. (Cl. 106—36)

My invention is a composition, which, when applied to the walls and ceilings of a room, auditorium, church or any other enclosed building, becomes a plaster for the purpose of absorbing and deadening sounds, noises and reverberations to insure better and more efficient acoustics. This composition, when water is added and mixed with it, is applied with a trowel as a plaster to walls and ceilings in much the same manner as ordinary plaster and is readily workable and adheres to the walls and ceilings with permanent tenacity.

In addition to its characteristics of ready workability and adherence, it has proven itself, after exhaustive tests and experiments which I have conducted, to have a higher coefficient of sound absorption than any other material now in use.

Before application and before water is added to it, it has proven itself to be a composition which does not deteriorate nor spoil with time and is readily put into sacks and other containers for shipment or storage.

My composition is composed of the following ingredients:

1. Cellulose ($C_6H_{10}O_5$), finely mangled and cleaned.

This cellulose for practical purposes is used in the form of cotton or other vegetable refuse such as bagasse, sawdust, bark, cotton hulls, grain chaff, corn trimmings, straw, etc.

2. Fibered asbestos.

3. Powdered talc ($H_2Mg_3Si_4O_{12}$). Various variations of which are called potstone, rensselaerite, soapstone, steatite or diatomaceous earth.

4. Zinc sulphate.

5. Dextrin. However, casein, albumin or glue may be used instead of dextrin, depending upon the type of job or the conditions under which one is working. This variation in my composition makes its use more flexible in meeting questions of color adaptation, economical requirements, climatic handicaps as well as questions of suitable quality prerequisites.

Any color pigment, of course, can be added to suit the individual requirements which may present themselves for color.

This composition is prepared by mixing the above ingredients in about the following proportions:

1. Cellulose_____ Six (6) cubic feet
2. Fibered asbestos_____ One (1) cubic foot
3. Powdered talc_____ Four (4) pounds
4. Zinc sulphate_____ One (1) pound
5. Dextrin_____ Five (5) pounds The composition containing the above referred to ingredients has a dry fibrous character prior to being mixed with water.

It must be noted that the primary proportion of this formula is in the first instance a formula of six (6) cubic feet of cellulose to one (1) cubic foot of filtered asbestos with the secondary balancing of four (4 lbs.) pounds of powdered talc, one (1 lb.) pound of zinc sulphate to five (5 lbs.) pounds of dextrin. All these amounts are the average. The proportion of six (6) of cellulose to one (1) of asbestos, of course, will vary greatly if one uses cellulose in its cotton form at one time or place and cellulose in its sawdust form at another, and it must be remembered that the cellulose in whatever form should be thoroughly mangled and cleaned.

Consequently, all these proportions may be increased or decreased, depending upon the quality of the product desired, as well as other considerations in respect to the availability of material for cellulose, the color desired, the economical considerations and the type of job desired.

In other words the proportion of several ingredients in my composition can be increased or decreased without materially affecting the properties of the composition and I, therefore, do not limit myself strictly to said proportions. I again point out that in respect to the ingredient No. 5, casein, albumin or glue may be added instead of dextrin, which makes the composition more suitable for different types of requirements, depending upon color desired, climatic conditions, economical considerations, availability of the ingredient and its cost, and the quality of work desired.

When it is desired to apply this composition as a plaster, an average of five (5) gallons of water is added to every one (1) cubic foot of composition. This watered mixture is then applied with the trowel upon the walls and ceilings in the same manner that ordinary plaster is applied. Instead of employing dextrin as a binder I may use casein, albumin, or glue.

Having thus described my invention, what I claim is:—

1. A composition to be used as a wall plaster, comprising cellulose, divided asbestos, zinc sulphate and a binder selected from the group consisting of dextrin, casein, albumin, and glue.

2. A composition to be used as a wall plaster, comprising a plant fibrous material, fibered asbestos, zinc sulphate, and dextrin, the entire mass having a dry fibrous character prior to the addition of water.

3. A composition to be used as a wall plaster, comprising an organic fibrous material, fibered asbestos, zinc sulphate, and dextrin, the organic fibrous material being present in a preponderance by volume with respect to the volume of the fibered asbestos, the entire mass having a dry fibrous character prior to the addition of water.

MARIO VALDASTRI.